Oct. 22, 1968   B. C. GOLDEN   3,406,610
PLASTIC DRAWSTRING BAG MACHINE
Filed Aug. 17, 1965   9 Sheets-Sheet 1

INVENTOR
Bertie C. Golden
BY Munson H. Lane
ATTORNEY

Oct. 22, 1968      B. C. GOLDEN      3,406,610

PLASTIC DRAWSTRING BAG MACHINE

Filed Aug. 17, 1965      9 Sheets-Sheet 5

INVENTOR
Bertie C. Golden
BY Munson H. Lane
ATTORNEY

Oct. 22, 1968 B. C. GOLDEN 3,406,610
PLASTIC DRAWSTRING BAG MACHINE
Filed Aug. 17, 1965 9 Sheets-Sheet 9

INVENTOR
Bertie C. Golden
BY Munson H. Lane
ATTORNEY

United States Patent Office 3,406,610
Patented Oct. 22, 1968

3,406,610
PLASTIC DRAWSTRING BAG MACHINE
Bertie C. Golden, 7506 Brookside Blvd.,
Richmond, Va. 23227
Filed Aug. 17, 1965, Ser. No. 480,329
36 Claims. (Cl. 93—8)

ABSTRACT OF THE DISCLOSURE

A machine and method for making plastic bags from flat tubular stock and equipping the bags with drawstrings. The machine includes a pair of stock guiding bars with an intermediate creasing plate for reentrant doubling of one longitudinal edge portion of the stock. Heat sealing means and severing means on the creasing plate form the doubled edge portion of the stock with a pair of hems. The guiding bars have opening means over which the hems pass, and means are provided for passing lengths of drawstring through the opening means so that the drawstring is drawn into the hems by movement of the hems along the bars. Additional heat sealing means beyond the opening means sever the stock transversely into individual bags and join together the severed bag edges with drawstring ends projecting from the hems.

---

This invention relates to new and useful improvements in bag making machines, and in particular the invention concerns itself with machines for making bags which are equipped with a drawstring at the mouth thereof, the drawstring being extended through hems provided at the bag mouth.

The principal object of the invention is to provide, in a machine of this type, novel and highly efficient means for inserting the drawstring into hems already formed on the material stock from which the bags are being made, the drawstring inserting operation taking place more-or-less continuously and simultaneously with advancing movement of the stock through the machine. In other words, with the drawstring appropriately positioned, the movement of the stock causes the drawstring to be automatically extended through the hems.

The drawstring inserting means of the invention may be used on material stock which has already been formed with hems in any suitable conventional manner, although if desired, the hem forming means may be embodied with the drawstring inserting means in the same machine, as hereinafter disclosed.

The machine of the invention embodying the hem forming and the drawstring inserting means is particularly well adapted for making drawstring-equipped bags from thin plastic material, heat sealing being employed to secure the hems and edges of the bags. However, it will be apparent that the drawstring inserting means of the invention may also be used for stringing bags made of other materials, such as cloth for example, where the hems have already been formed by sewing.

Other objects, features and advantages of the invention will be understood from the following description taken in conjunction with the accompanying drawings, wherein like characters of reference are used to designate like parts, and wherein:

Referring now to the accompanying drawings in detail, reference is first drawn to the embodiment of the invention disclosed in FIGS. 1–27 and designated generally by the reference numeral 10.

Figure 2:
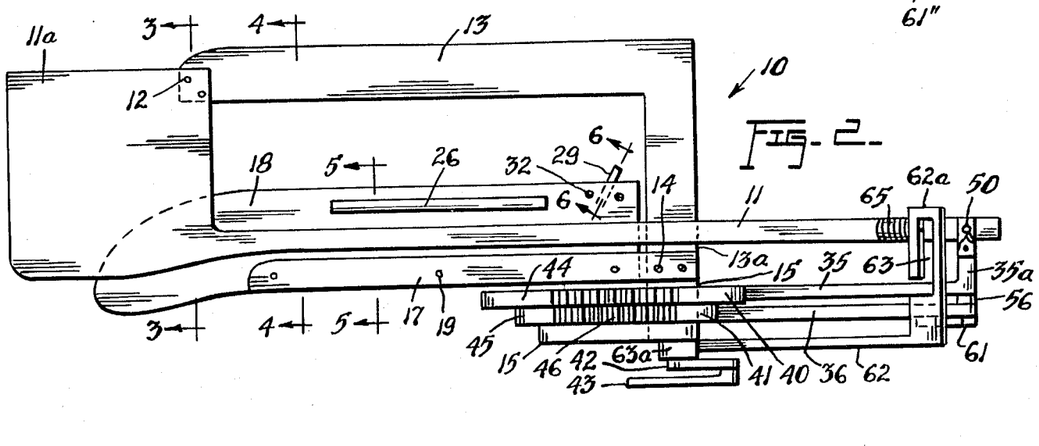
FIGURE 2 is a top plan view thereof.
Figures 3, 4:
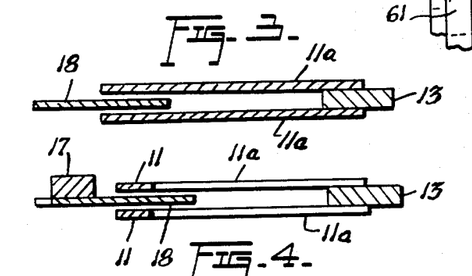
FIGURE 3 is an enlarged cross-sectional view, taken substantially in the plane of the line 3—3 in FIG. 2.
FIGURE 4 is an enlarged cross-sectional view, taken substantially in the plane of the line 4—4 in FIG. 2.

The bag making machine 10 embodies in its construction a pair of horizontally elongated stock guiding members comprising bars 11 which are disposed in mutually spaced, superposed relation, the front ends of these bars being integral with plate-like enlargements 11a which project horizontally to one side of the bars and are secured as at 12 to upper and lower surfaces of an elongated horizontal frame member 13. As shown in FIG. 2, the frame member 13 is substantially L-shaped. It corresponds in thickness to the vertical spacing of the two bars 11 so that in effect it lies in a horizontal plane between the two bars.

Figure 5:
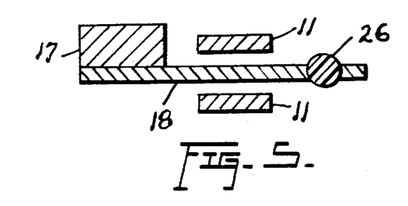
FIGURE 5 is an enlarged cross-sectional view, taken substantially in the plane of the line 5—5 in FIG. 2.
Figures 6, 7:
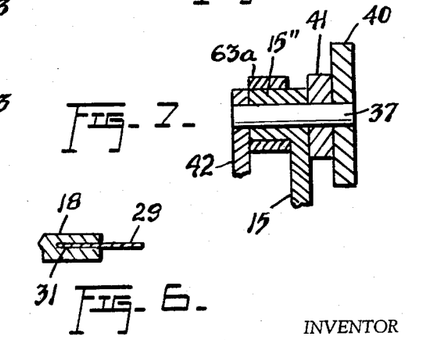
FIGURE 6 is an enlarged, fragmentary sectional detail, taken substantially in the plane of the line 6—6 in FIG. 2.
FIGURE 7 is an enlarged, fragmentary sectional detail, taken substantially in the plane of the line 7—7 in FIG. 1.
Figure 8:
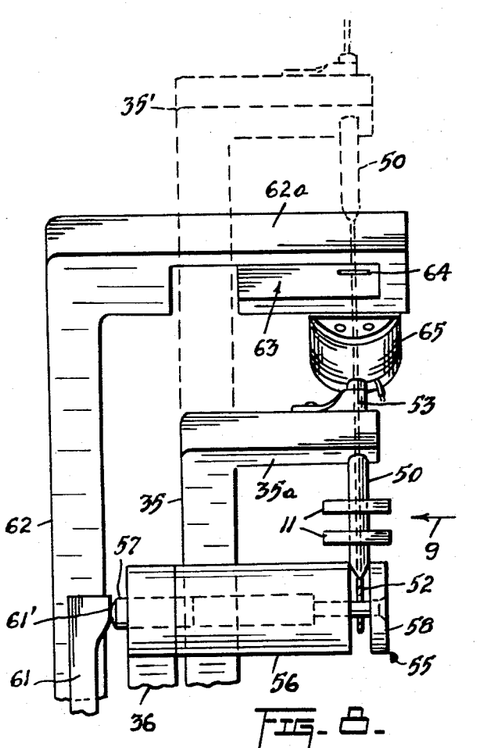
FIGURE 8 is an enlarged, fragmentary elevational view, taken in the direction of the arrow 8 in FIG. 1.
Figure 18:
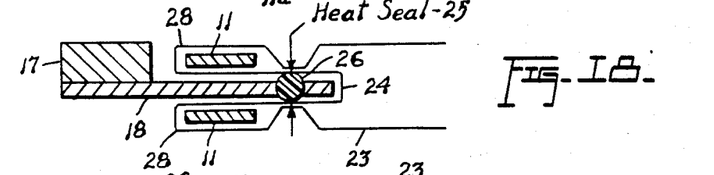
FIGURE 18 is a diagrammatic view showing the heat sealing and hem forming operation.
Figure 19:
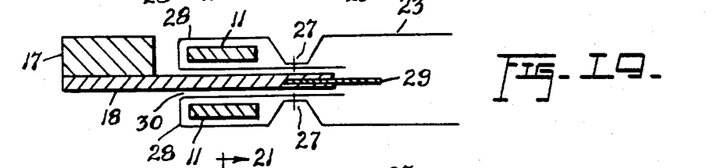
FIGURE 19 is a diagrammatic view showing the hem severing operation.
Figure 20:
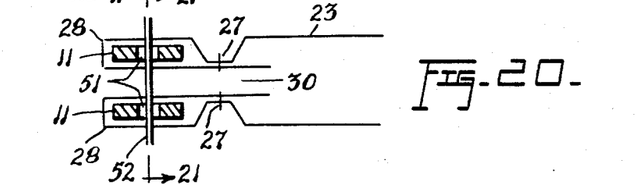
FIGURE 20 is a diagrammatic view showing the insertion of the drawstring, the view being taken transversely of the stock guiding bars in the same manner as FIGS. 16–19.
Figure 40:
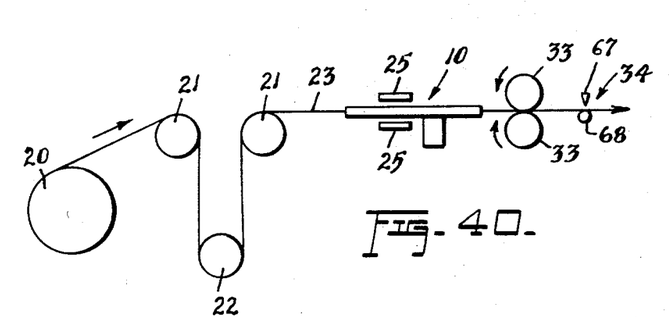
FIGURE 40 is a diagrammatic illustration showing the flow path of stock through the machine, this being applicable to all embodiments of the invention involving tubular stock.
Figure 41:
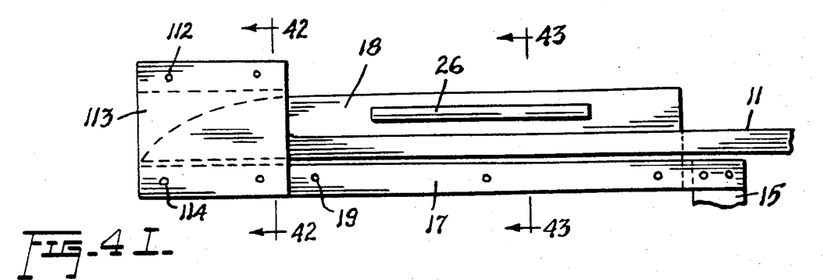
FIGURE 41 is a fragmentary plan view, similar to those in FIGS. 2 and 30, but showing a modified arrangement of the hem forming means.
Figure 42:
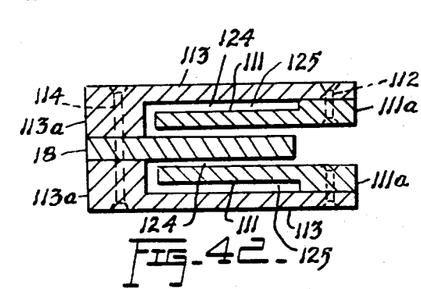
FIGURE 42 is an enlarged sectional view, taken substantially in the plane of the line 42—42 in FIG. 41.
Figure 43:
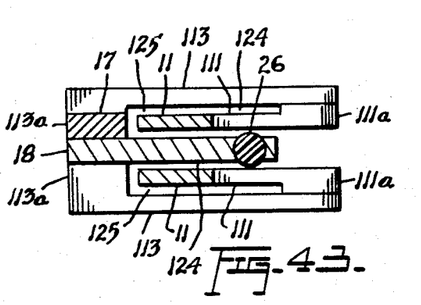
FIGURE 43 is an enlarged sectional view, taken substantially in the plane of the line 43—43 in FIG. 41.

The rear end portion 13a of the frame member 13 passes freely between the bars 11 to the side of the bars opposite from that on which the enlargements 11a are located (see FIG. 2), the frame member portion 13a being secured, as by suitable screws 14, to the upper end of one leg of an upstanding U-shaped bracket 15 which serves to mount the entire machine on a suitable supporting surface 16. Also secured to the same one leg of the bracket 15 by the screws 14 is a horizontal strap 17 which extends substantially in parallel along the outer side of the bars 11 and has a horizontal creasing plate 18 secured thereto, as by suitable fasteners 19. It will be observed, for example in FIGS. 2 and 3, that the creasing plate 18 projects horizontally inwardly into the space between the bars 11 as well as between the bar enlargements 11a. The machine is adapted to make bags from a flat running length of tubular plastic stock, and reference to the diagrammatic showing in FIG. 40 will reveal that this stock, after being unwound from a supply roll 20, passes over suitable guide rolls 21 and under a gravity tensioning roll 22 before its delivery to the machine 10. The tubular stock, indicated generally at 23, first passes over and under the plate-like enlargements 11a at the front end of the stock guiding bars 11, enveloping both enlargements as well as the frame member 13 as the stock moves along the bars 11 (see FIGS. 16 and 17). The creasing plate 18, projecting into the space between the bars 11, causes one longitudinal edge portion of the stock to be doubled within itself in a reentrant manner as indicated at 24 in FIG. 17 by the time the stock reaches a pair of elongated heat sealing units 25, shown diagrammatically in FIG. 40. The heat sealing units 25, which are of any suitable conventional type, are disposed longitudinally above and below the creasing plate 18 for cooperation with a backing roller 26 of material such as Teflon, or the like, which is mounted within the plate 18 as shown in FIGS. 2, 5 and 18. The heat sealing units 25 coacting with the roller 26 bond together the doubled portion 24 of the stock both above and below the roller as indicated at 27, thus forming a pair of superposed hems 28 each of which envelopes one of the guiding bars 11, as will be apparent from FIGS. 18–20. At a point beyond the heat sealing means the creasing plate 18 is provided with an inwardly projecting cutter blade 29 and as the stock travels past this cutter blade, the doubled portion 24 of the stock is longitudinally severed so that the two hems 28 are separated from each other and a bag mouth 30 is formed therebetween, as shown in FIGS. 19 and 20. As detailed in FIG. 6, the cutter blade 29 is held in a slot 31 formed in the inner longitudinal edge of the plate 18 and suitable screws 32, shown in FIG. 2, are employed for clamping the blade in position. FIG. 40 also shows a pair of drive rollers 33 which are suitably mounted beyond the rear ends of the stock guiding bars 11 of the machine 10, the stock 23 passing between these rollers and being propelled thereby along the guides or bars 11 to a second heat sealing device 34 hereinafter to be described.

Figure 1:
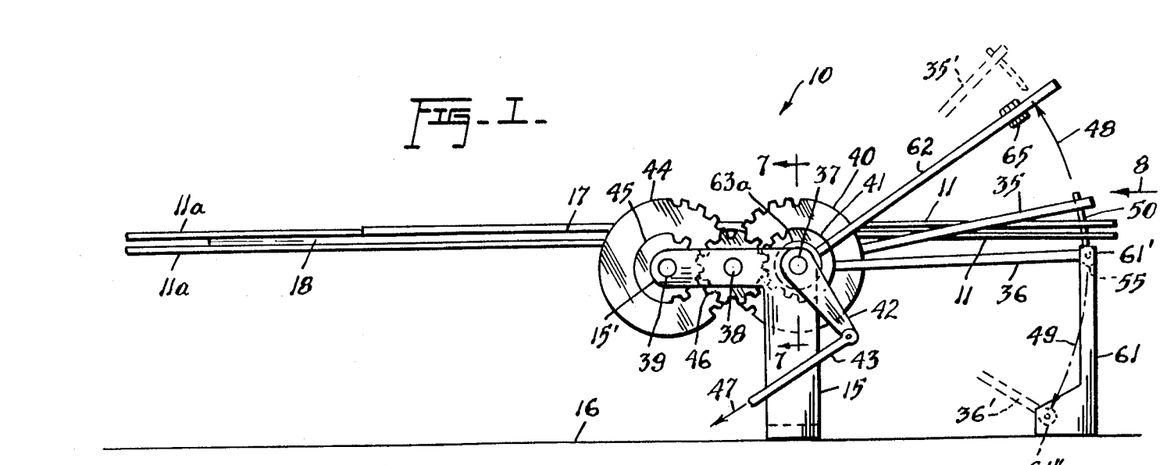
FIGURE 1 is a side elevational view showing one embodiment of the bag making machine of the invention.

As thus far described the machine has formed a pair of hems at one longitudinal edge of the stock and has separated the hems to provide a bag mouth therebetween, the two hems 28 moving rearwardly along the guiding bars 11 with each hem enveloping one of the bars. The next operational step of the machine deals with the insertion of a drawstring into the hems while the stock is moving along the guiding bars, the drawstring inserting means comprising a pair of oscillatory arms, namely, an upper arm 35 and a lower arm 36 which are disposed at the outer side of the rear end portions of the bars 11 for coordinated oscillating movement about a common horizontal axis represented by a shaft 37. The shaft 37 is rotatably journalled in the outer leg of the aforementioned U-shaped bracket 15, which leg is provided with an integral, horizontal extenison 15′ carrying a pair of stub shafts 38, 39. Also formed integrally with the upper end of the outer leg of the bracket 15 is a tubular, outwardly projecting boss 15″ (see FIG. 7), through which the shaft 37 passes. The upper arm 35 is rigidly secured to the periphery of a gear 40 which is keyed to the shaft 37 next to a smaller gear 41 which is freely rotatable on that shaft. The outer end of the shaft 37 has keyed thereto a crank 42, it being apparent that when the crank 42 is oscillated, as by a suitably actuated reciprocable drive link 43, oscillatory movement will be imparted to the gear 40 and to the arm 35 secured thereto. The gear 40 meshes with a similar gear 44 which is rotatable on the stub shaft 39 in unison with a smaller gear 45, the latter meshing with an idler gear 46 on the stub shaft 38. The gear 46 in turn meshes with the aforementioned gear 41 which has the lower arm 36 rigidly secured to the periphery thereof. The gears 40, 44 are of the same size, as are the gears 41, 45, 46, and the arrangement provides a reverse drive so that when the gear 40 is turned in one direction, for example counter-clockwise as viewed in FIG. 1, the gear train causes the gear 41 to be turned in the opposite direction, for example clockwise. Thus, if the link 43 moves in the direction of the arrow 47 to raise the arm 35 in the direction of the arrow 48, the arm 36 will be lowered as at 49, and vice versa. The arm 35 in FIG. 1 is shown by full lines in its lowered position and by the dotted lines 35′ in its raised position. Similarly, the arm 36 is shown by full lines in its raised position and by the dotted lines 36′ in its lowered position, it being understood that the two arms are coordinated in their oscillating movement toward and away from the guiding bars 11.

Figure 9:
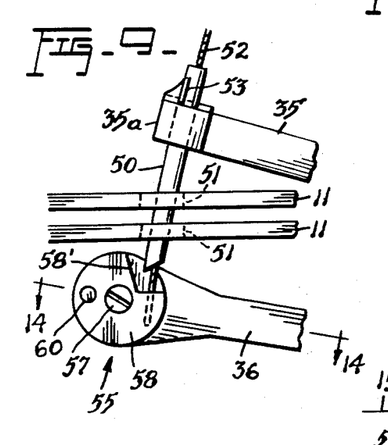
FIGURE 9 is a fragmentary elevational view, taken in the direction of the arrow 9 in FIG. 8 and showing the needle of the upper arm passed through the opening means in the bars.

The upper arm 35 has an inwardly projecting portion 35a in which is mounted a tubular needle 50 having a tapered end or point 50′. The needle 50 is curved to a radius corresponding to its distance from the shaft 37, and when the arm 35 is lowered as shown in FIGS. 1 and 9, the needle 50 passes downwardly through opening means consisting of a pair of vertically aligned apertures 51 formed in the rear end portions of the stock guiding bars 11. The term "opening means" is used generically in the claims to cover apertures 51 in the embodiment of FIGS. 1 to 27 and to cover the open slots 89, 89a in the embodiment of FIGS. 29 to 39. The needle 50 slidably receives the drawstring 52 which is supplied to the needle from a suitable source. A spring clip 53 is mounted on the arm portion 35a as by a screw 54 (see FIG. 12) and the upper end portion of the needle 50 is open at one side thereof so that the spring clip 53 may frictionally engage the drawstring in the needle. This permits the needle to pull the drawstring downwardly while the arm 35 is being moved from its raised to its lowered position, without the needle sliding off the end of the drawstring.

Figure 14:
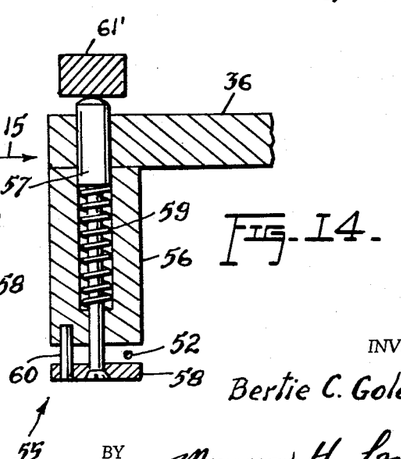
FIGURE 14 is a sectional view, taken substantially in the plane of the line 14—14 in FIG. 9.

It will be noted that the drawstring projects somewhat from the lower, pointed end of the needle 50 as shown in FIG. 9, so that when the arm 35 is lowered and the needle is passed through the apertures 51 in the bars 11, the projecting end portion of the drawstring may be caught by drawstring gripping means 55 carried by the lower arm 36. The gripping means 55 comprise a cylindrical member 56 which is secured to and projects inwardly from the arm 36. A plunger 57 is slidably positioned in the member 56 as is best shown in FIG. 14, one end of the plunger projecting outwardly from the arm 36 while its other end has mounted thereon a disc 58. A compression spring 59 biases the plunger 57 so as to normally urge the disc 58 against the adjacent end of the member 56, but if the plunger is slid inwardly against the action of the spring 59, the disc 58 will be moved away from the member 56 to receive the drawstring 52 therebetween, as shown in FIG. 14. A portion of the disc 58 is preferably cut away as at 58' to provide clearance for the needle 50 while the projecting end portion of the drawstring is being received between the member 56 and the disc. A pin 60 projects from the member 56 through an aperutre in the disc to prevent the latter from rotating about the plunger 57, thus assuring that the cut away portion 58' of the disc is properly oriented with respect to the needle.

Figure 15:
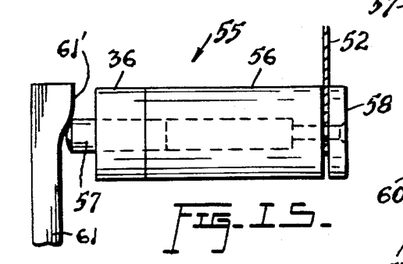
FIGURE 15 is a fragmentary elevational view, taken in the direction of the arrow 15 in FIG. 14.
Figure 16:
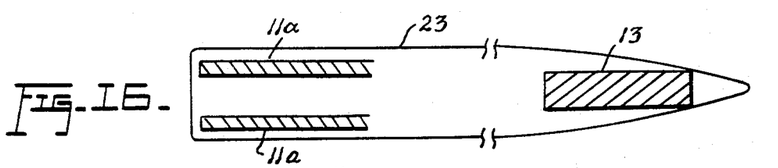
FIGURE 16 is a diagrammatic illustration showing passage of the stock over and under the guiding bars, the view being taken transversely of the bars.
Figure 17:
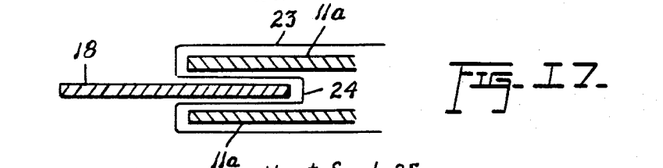
FIGURE 17 is a diagrammatic view, similar to FIG. 16, but showing the stock creasing operation.

A bracket 61 is fixedly mounted in any suitable manner at one side of the path of oscillation of the lower arm 36 (see FIGS. 1 and 2) and the upper end of the bracket is provided with a cam-surfaced abutment 61' (see FIG. 15) which is engaged by the outer end of the plunger 57 when the arm 36 is in its fully raised position. This causes the plunger to be slid inwardly to separate the disc 58 from the member 56 for reception of the drawstring 52 therebetween. However, as the arm 36 commences to move downwardly, the plunger 57 is disengaged from the abutment 61' and the spring 59 causes the disc 58 to be drawn toward the member 56, thus gripping the drawstring end as shown in FIG. 15. A similar abutment 61'' (see FIG. 1) is provided on the lower portion of the bracket 61 for engaging the plunger 57 and sliding the disc 58 away from the member 56, thus providing means to release the drawstring when the arm 36 reaches the lower end of its travel.

Means are provided for cutting the drawstring to a predetermined length when the upper arm 35 is raised. These means comprise a third arm or limb 62 which is rigidly secured to a sleeve 63, adjustably mounted in a fixed position on the aforementioned boss 15'' of the bracket 15. The limb 62 is adjusted to a desired elevation above the bars 11, whereupon it is suitably locked, as by clamping means or a set screw, on the boss 15''. The limb 62 is provided with an inwardly offset end portion 62a formed with an open recess, this recess providing clearance for the end of the arm 35 and arm portion 35a as will be apparent from FIG. 13, so that the arm 35 may pass upwardly beyond the limb portion 62a to its fully raised position 35' as shown in FIG. 1.

The limb portion 62a carries a suitable drawstring cutting device, as for example, a reciprocable blade 64 actuated by an electromagnet 65. The limb 62 is positioned so that in the raised position 35' of the arm 35, the cutter blade 64 is disposed somewhat below the lower end of the needle 50, and when the blade 64 is projected by the solenoid 65 as indicated at 64' in FIG. 11, the drawstring 52 is severed so as to leave an end portion thereof projecting from the needle for subsequent gripping by the gripping means 55 on the lower arm 36, as already described.

The operation of the drawstring inserting mechanism will now be explained. Let it be assumed that the lower arm 36 is in its lowered position 36', the upper arm 35 is in its raised position 35', the drawstring 52 is held in the needle 50 by the spring clip 53, and the stock 23 has had the hems 28 formed, such hems enveloping the guiding bars 11 and covering the apertures 51. The actuating link 43 causes the upper arm 35 to be lowered and the lower arm 36 to be simultaneously raised, so that the two arms approach the bars 11, the needle 50 on the arm 35 pulling the drawstring with it. As the needle 50 passes through the apertures 51 in the bars 11, its pointed end 50' cuts through both the hems 28 and the projecting end of the drawstring is caught by the gripping means 55 on the lower arm 36.

Figure 10:
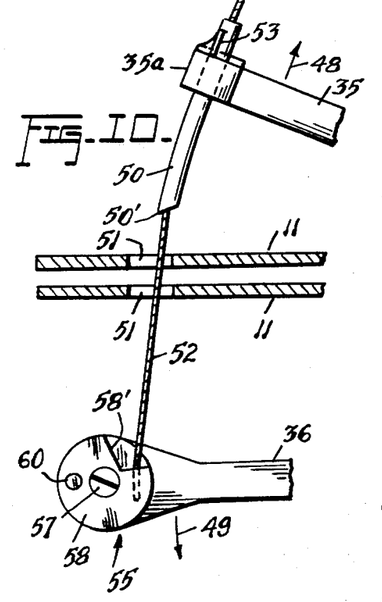
FIGURE 10 is a view, similar to that in FIG. 9, but showing the needle withdrawn from the opening means in the bars.
Figure 11:
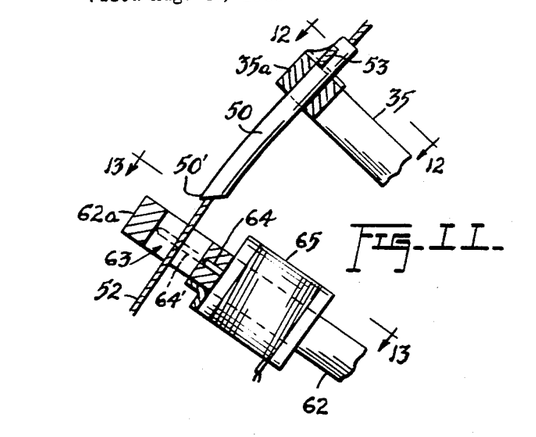
FIGURE 11 is a fragmentary view, partly in section and partly in elevation, showing the upper arm with its needle in a raised position above the drawstring cutting means.
Figure 12:
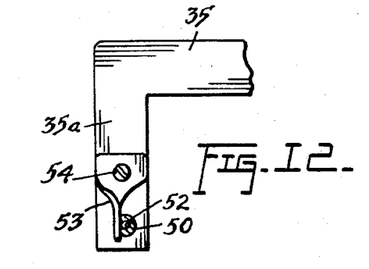
FIGURE 12 is a fragmentary plan view, taken in the plane of the line 12—12 in FIG. 11.
Figure 13:
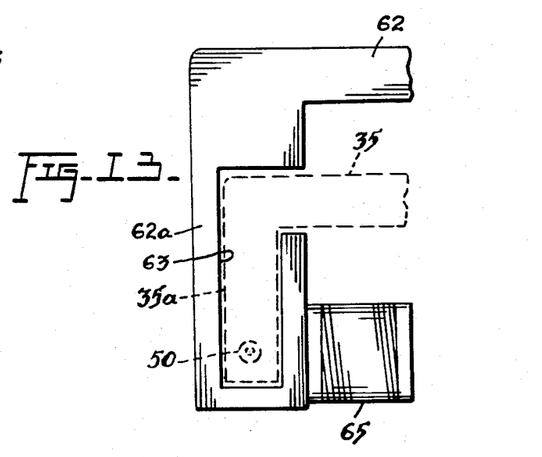
FIGURE 13 is a fragmentary plan view, taken in the plane of the line 13—13 in FIG. 11.

The upper arm 35 then commences to be raised while the lower arm 36 commences to be lowered, the drawstring being pulled downwardly by the gripping means 55 on the lower arm while the needle 50 slides upwardly along the downwardly moving string, it being understood that the spring clip 53 is not strong enough to prevent such upward sliding movement of the needle. As a result, the drawstring is extended substantially vertically through the bar apertures 51 and through the hems 28 of the stock, as shown in FIG. 10 and diagrammatically illustrated in FIGS. 20 and 21.

It may be noted at this point that, if desired, rotation of the stock driving rollers 33 may be temporarily interrupted to halt advancing movement of the stock along the bars 11 for a short period while the needle 50 passes downwardly and upwardly through the apertures 51, so as to prevent tearing of the hems 28 such as could occur if the stock were moving during passage of the needle therethrough.

In any event, when the lower arm 36 reaches its lowered position 36', the end of the drawstring is automatically released from the gripping means 55. Simultaneously, the arm 35 reaches its raised position beyond the limb 62, at which point the solenoid 65 is energized and the cutter blade 64 severs the drawstring below the lower end of the needle, in readiness for the next cycle of operation.

Figure 21:
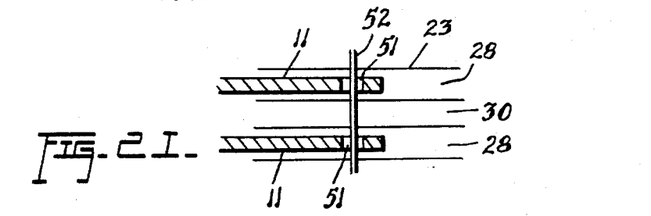
FIGURE 21 is a diagrammatic view of the subject shown in FIG. 20 and in the plane of the line 21—21 in FIG. 20, which plane is longitudinally of the guiding bars.
Figure 22:
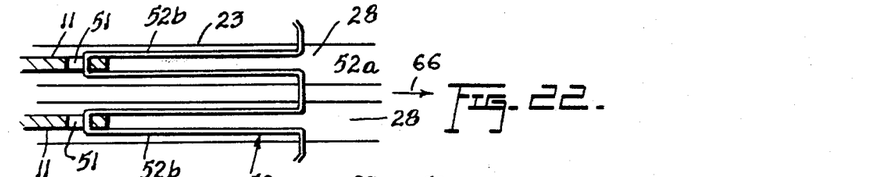
FIGURES 22–25 are diagrammatic views, similar to that in FIG. 21 but showing the progression of the drawstring being drawn into the hems as the stock is advanced along the guiding bars.
Figure 23:
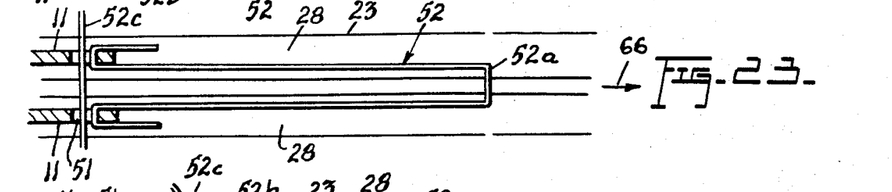
Figure 24:
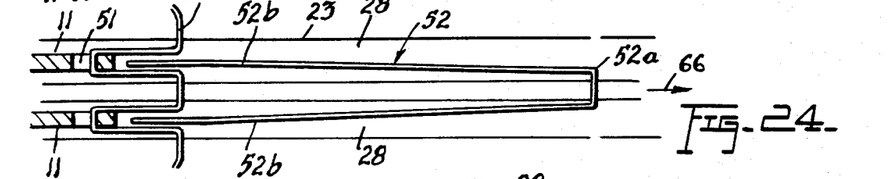

In the meantime, the stock continues to advance along the bars 11 as indicated at 66 in FIGS. 22–25. The cut drawstring projects both upwardly and downwardly from the hems as indicated in FIG. 21 and while the stock advances relative to the stationary bars 11, the center portion 52a of the string moves with the stock, thus causing the end portions 52b of the string to be pulled into the hems, sliding, as they do so, through the bar apertures 51, as will be apparent from FIG. 22. As such, the bars 11 with the apertures 51 provide means for slidably engaging the string and pulling the same into the hems. Eventually, when the stock advances far enough, the ends of the string are completely withdrawn from the bar apertures 51 and the string is completely contained within the hems as shown in FIG. 24, but before this stage is reached, a new drawstring 52c for the next bag is passed through the hems as shown in FIG. 23, while the ends of the first drawstring are not yet completely withdrawn from the apertures 51. The purpose of this will become apparent hereinafter.

Figure 25:
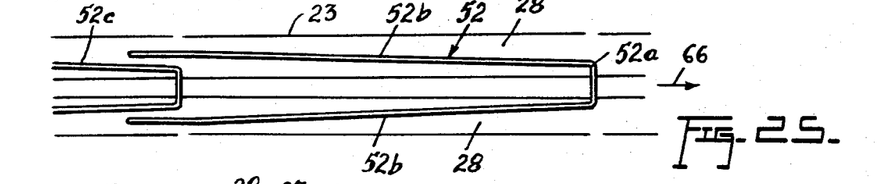

As the stock continues to advance it eventually leaves the rear ends of the guiding bars 11 with the ends of one drawstring 52 overlapping the next drawstring 52c within the hems 28, as shown in FIG. 25. In this condition the stock is delivered to the aforementioned second heat sealing means 34 which, as diagrammatically shown in FIG. 40, comprises a heat sealing unit 67 cooperating with a Teflon backing roller 68. The unit 67 and roller 68 are disposed transversely of the direction of stock movement, the unit 67 being intermittently brought against the roller 68 so as to engage the stock in the plane indicated at 34 in FIG. 26, this being before the ends of the string portions 52b are reached and in advance of the next string 52c.

Figures 26, 27, 28:
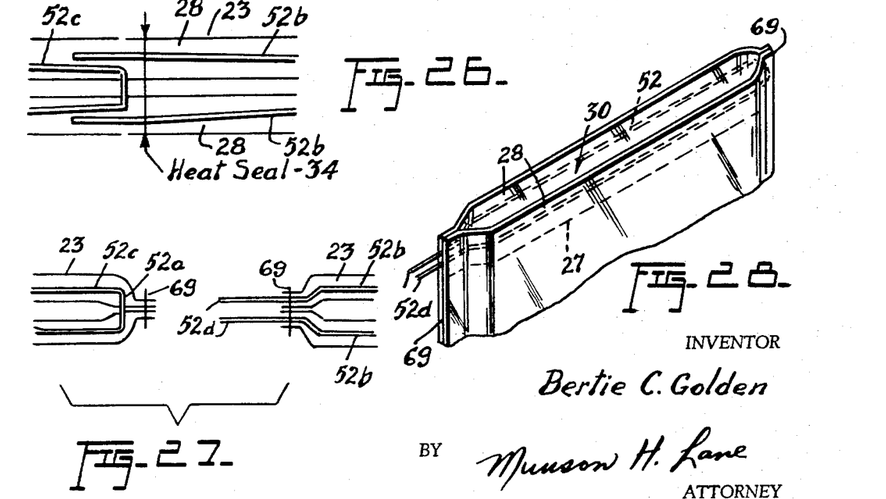
FIGURE 26 is a diagrammatic view of the second heat sealing operation.
FIGURE 27 is a group diagrammatic view showing two adjacent bag portions after separation by the sealing operation of FIG. 26.
FIGURE 28 is a fragmentary perspective view of the completed bag.
Figure 29:
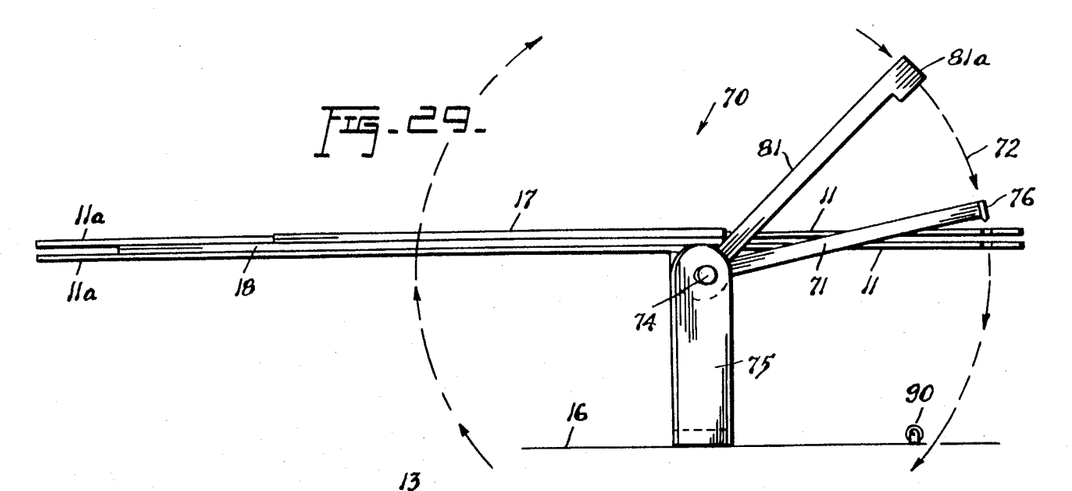
FIGURE 29 is a side elevational view showing a modified embodiment of the invention.
Figure 30:
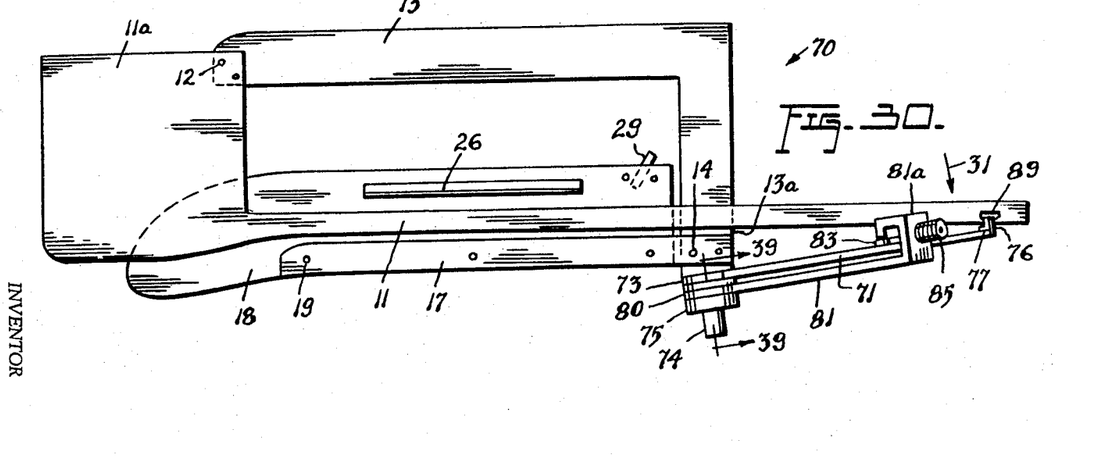
FIGURE 30 is a top plan view thereof.

The heat sealing operation at the means 34 takes place along a transverse band and is such as to sever or divide the running length of the stock transversely into individual bags and to join together the severed or cut side edges of the individual bags as indicated at 69 in FIGS. 27 and 28. However, it is to be particularly noted that the individual bags are cut apart by the heat sealing means 34 in a plane in advance of where the ends of the drawstring of one bag, for example the drawstring 52, overlap the drawstring of the next bag, for example the drawstring 52c, so as a result, when the individual bags are separated by the heat sealing means 34, they may be pulled apart so that the terminal portions 52d of the drawstring of each bag project outwardly from the adjacent heat sealed side edge of the bag, as will be apparent from FIGS. 27 and 28. These projecting terminal portions of the drawstring, of course, may be pulled upon to close the bag mouth of the completed bag.

The cycle of the drawstring inserting and bag forming operation is thus completed and repeats itself sequentially as running lengths of stock, corresponding to the width of individual bags, pass through the machine.

It may be noted that, with regard to the width of individual bags being formed, the reciprocating stroke of the link 47 which actuates the arms 35, 36 may be adjusted so that an appropriate length of drawstring is pulled to suit the bag width, a further adjustment being effected by setting the sleeve 63 on the boss 15″ of the bracket 15 so that the blade 64 severs the drawstring at a proper dimension.

Reference is now drawn to the modified embodiment of the invention shown in FIGS. 29–39 which, for most part, is the same as the embodiment of FIGS. 1–27 except for a different structural and functional arrangement of the drawstring inserting means. Thus, except for the drawstring inserting means, the modified embodiment requires no further description, it being understood that once the drawstring is passed vertically through the hems, it is drawn into the hems as has been already explained in connection with FIGS. 20–28.

The modified embodiment of FIGS. 29–39, designated generally by the numeral 70, dispenses with the aforementioned oscillatory arms 35, 36 and in their place uses a single arm 71 which is unidirectionally rotatable as indicated at 72. The arm 71 is rigidly secured to and rotated by a hub 73 keyed to a shaft 74 journalled in a machine supporting bracket 75, the shaft 74 being continuously driven in any suitable manner. The arm 71 carries an inwardly projecting, arcuate cutter blade 76 which takes place of the needle 50 of the first mentioned embodiment, the blade 76 coacting with a gripper 77 which is pivoted to the arm 71 as at 78 and is biased toward the blade 76, as by a suitable spring 79. The end of the drawstring 52 is adapted to be caught between the blade 76 and the gripper 77, as will be hereinafter described.

The aforementioned bracket 75 is provided with a tubular boss 75′ on which is adjustably fixed a collar 80 having rigidly secured thereto a limb 81 (see FIG. 39), the limb 81 having an inwardly offset limb portion 81a.

Figure 31:
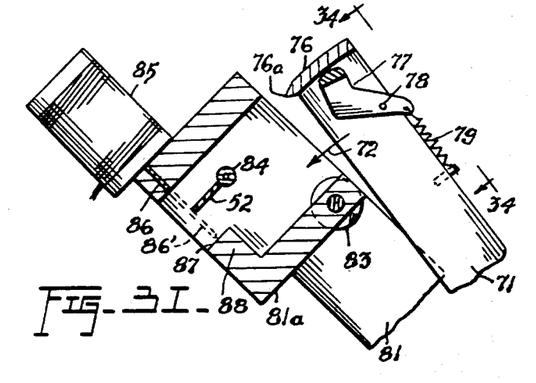
FIGURE 31 is an enlarged view, partly in section and partly in elevation, taken in the direction of the arrow 31 in FIG. 30 but showing the drawstring gripping arm above the drawstring guiding and cutting means.
Figures 32, 33, 35, 36:
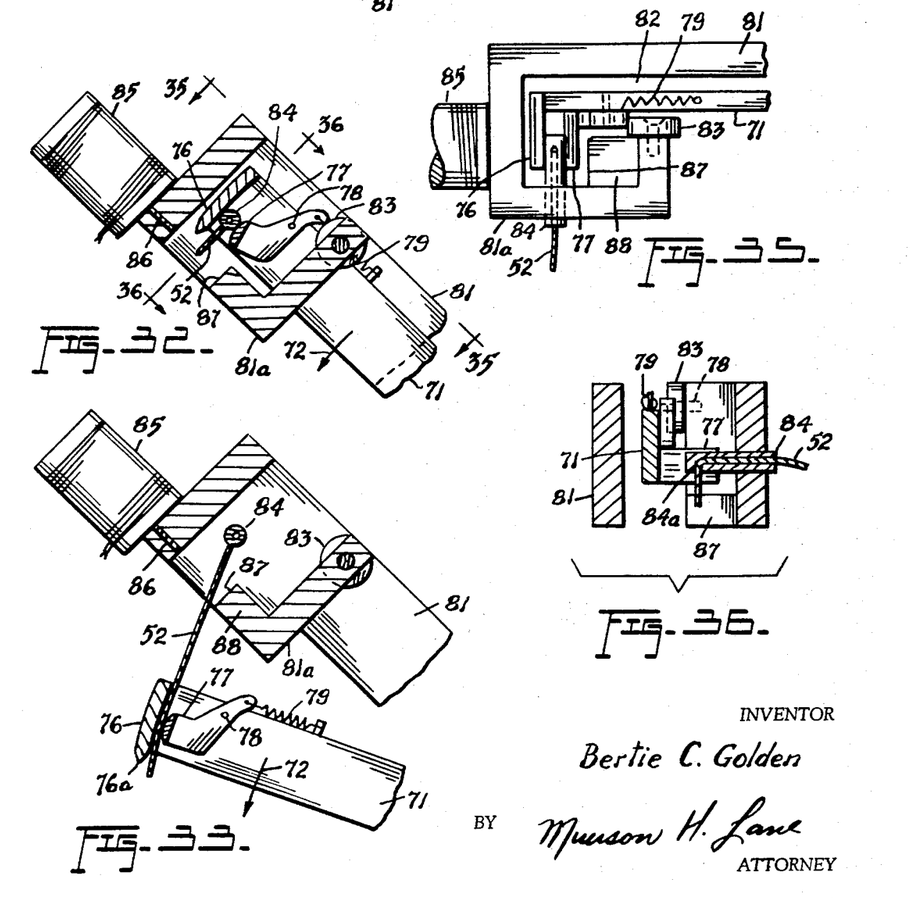
FIGURE 32 is a view, similar to that in FIG. 31, but showing the gripping arm within the drawstring guiding means.
FIG. 33 is a view, similar to those in FIGS. 31 and 32, but showing the gripping arm below the drawstring guiding means.
FIGURE 35 is a fragmentary plan view, taken in the plane of the line 35—35 in FIG. 32.
FIGURE 36 is a fragmentary sectional view, taken substantially in the plane of the line 36—36 in FIG. 32.
Figure 34:
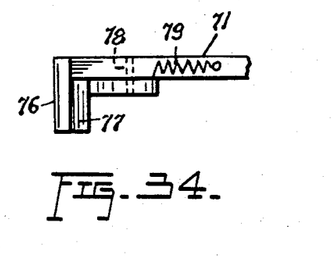
FIGURE 34 is a fragmentary plan view, taken in the plane of the line 34—34 in FIG. 31.

As shown in the plan view of FIG. 35, the limb portion 81a is box-shaped and open at the top and bottom thereof, and is also provided with a side passage 82 through which the arm 71 may pass during its rotating movement. FIGS. 31, 32 and 33 progressively show movement of the arm 71 with respect to the relatively stationary limb portion 81a, it being observed in FIGS. 32 and 35 that when the arm 71 travels through the passage 82, the blade 76 and gripper 77 pass through the box-like limb portion 81a and the free end of the gripper 77 comes into contact with a roller 83. The latter is mounted on the limb member 81a at one side of the passage 82 and engagement of the gripper 77 with the roller 83 causes the gripper to be drawn away from the blade 76 against the action of the spring 79 for catching the drawstring 52 as will be presently explained.

The drawstring 52 passes freely through a tubular guide 84 which is mounted in and extends through the inner side wall of the limb portion 81a. The drawstring passage in the tubular guide 84 is axial for most of its length (see FIG. 36), but is angulated at its inner end as at 84a so that the drawstring may leave the guide in a direction parallel to the plane of rotation of the arm 71.

The limb portion 81a also carries a solenoid 85 for actuating a reciprocable cutter blade 86 which is adapted to sever the drawstring 52 at a point somewhat below the guide 84. The blade 86 cooperates with a backing surface or abutment 87 afforded by a ledge 88 formed integrally inside the box-shaped limb portion 81a.

Figure 38:
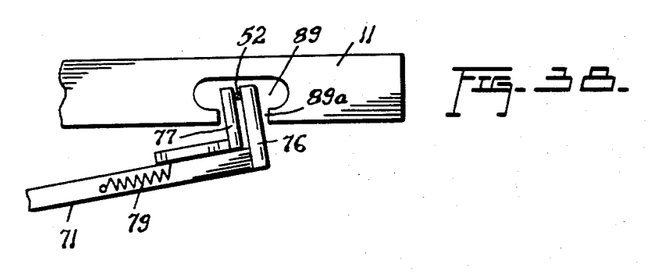
FIGURE 38 is a fragmentary plan view of the subject shown in FIG. 37.
Figure 39:
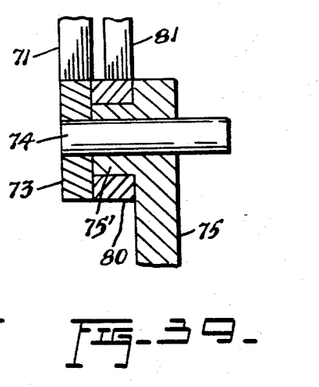
FIGURE 39 is an enlarged, fragmentary sectional detail, taken substantially in the plane of the line 39—39 in FIG. 30.

In place of the aforementioned apertures 51, the opening means in the bars 11 in this embodiment consist of slots 89 having an open outer side portion or recess 89a, as shown in FIG. 38. Finally, it will be noted that the shaft 74 is disposed obliquely with respect to the bars 11, so that the blade 76 and gripper 77 on the arm 71 may pass through the slots 89 in the bars, but by the time the arm 71 has turned through a half-circle, sufficient clearance is afforded to prevent interference of the arm 71 with the side strap 17 of the machine.

The operation of the embodiment of FIGS. 29–39 will now be explained without repetition of the stock creasing and hem forming procedure which was already discussed in connection with the embodiment of FIGS. 1–27. Thus, assuming that the stock is passing through the machine with the bag hems traveling along the bars 11, the arm 71 rotates in the direction of the arrow 72. Assuming further that the arm 71 is approaching the limb 81 as in FIG. 31, as the blade 76 and gripper 77 enter the box-like limb portion 81a, the gripper 77 comes into engagement with the roller 83 and is drawn away from the blade 76 against the action of the spring 79 so that the blade may pass on one side of the drawstring guide 84 and the gripper on the other side, as shown in FIG. 32. Then, as movement of the arm 71 continues and the gripper 77 moves below the drawstring guide, the gripper becomes disengaged from the roller 83 and the spring 79 urges the gripper against the blade 76, thus catching and firmly holding the drawstring end therebetween.

Figure 37:
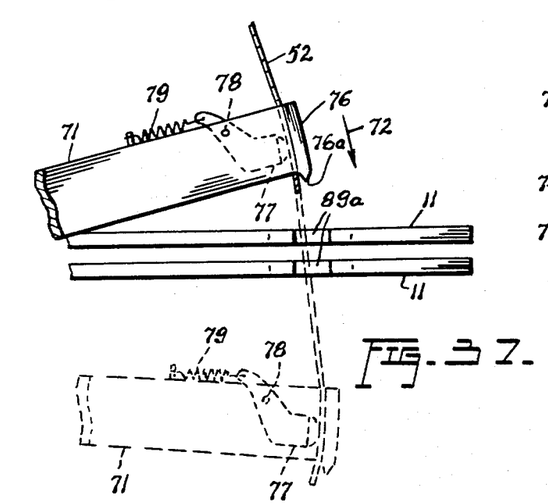
FIGURE 37 is a fragmentary elevational view showing the drawstring gripping arm in its passage through the guiding bars.

Continued movement of the arm 71 then causes the drawstring 52 to be pulled downwardly through the guide 84 as shown in FIG. 33 and when the arm 71 reaches the bars 11, the sharp lower edge 76a of the blade 76 cuts through both the hems on the bars while the blade and the gripper 77 pass downwardly through the opening means 89, 89a in the bars and pull the drawstring therethrough, as will be clearly apparent from FIG. 37. The arm 71 then still continues to pull the string downwardly to a predetermined extent coordinated with the width of the bags to be formed, until the arm reaches a position where a suitably mounted roller 90 (see FIG. 29) engages the gripper 77 on the arm 71 and draws it away from the blade 76 so as to release the end of the string. At the same time as this occurs, the solenoid 85 is energized so as to project the drawstring cutter blade 86 as at 86′ in FIG. 31, thus severing the string at a point slightly below the guide 84 so that an end portion of the string projects from the guide in readiness to be caught by the means 76, 77 on the next turn of the arm 71 during the next cycle of operation.

The drawstring has thus been placed substantially vertically through the hems of the stock and as the stock advances along the bars 11, the end portions of the drawstring are drawn into the hems as has been already explained in connection with the embodiment of FIGS. 1–27. It may be noted, however, that since the slots 89 in the bars 11 are somewhat longer than the width of their open side portions 89a, they form a bay, so to speak, into which the drawstring is seated by the advancing movement of the stock, so that there is no possibility of the drawstring becoming displaced laterally from the slots through the open side portions thereof.

The individual bag cutting and sealing means 34 of FIG. 40 are, of course, also applicable to the embodiment of FIGS. 29–39 in the manner which has been already described.

Figure 44:
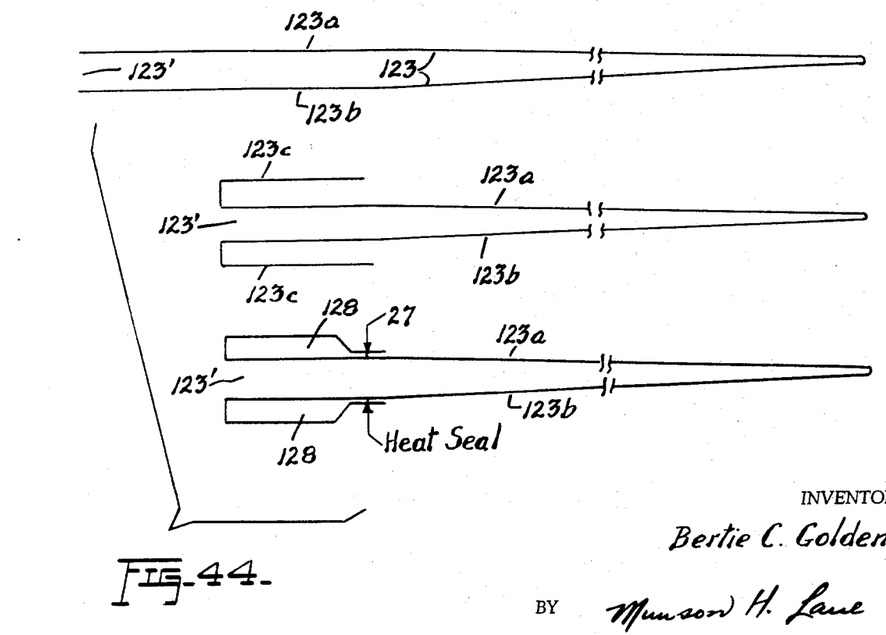
FIGURE 44 is a diagrammatic illustration of the hem formation by the hem forming means of FIGS. 41–43.

Finally, reference is drawn to FIGS. 41–44 which relate to a modified arrangement of the hem forming means and particularly to means for forming hems on plastic stock which has been folded longitudinally and has one open longitudinal edge, as distinguished from the tubular open stock used with the embodiments of FIGS. 1–27 and 29–39. Such folded or doubled stock, diagrammatically shown at 123 in FIG. 44, is delivered to the machine in a running length, the open longitudinal edge of the stock being indicated at 123'.

In this instance the stock guiding bars 11 are also disposed in spaced relation above and below the plate 18 as in the previously described embodiments, but the plate 18 merely serves as a separation plate rather than a creasing plate, since creasing of the open edge 123' of the stock is not necessary. The front ends of the bars 11 are provided with widened portions 111 which are thickened at one side thereof as at 111a, and these thickened portions are secured, as by the fasteners 112 to a pair of supporting plates 113. The latter are spaced from the bar portions 111 and have thickened side edges 113a secured by suitable fasteners 114 to the upper and lower surfaces of the plate 18, as will be clearly apparent from FIGS. 42 and 43.

As the folded material stock 123 approaches the machine, its upper and lower layers 123a, 123b pass respectively above and below the separating plate 18, that is, through the spaces 124 between the separating plate and the bar portions 111, and the open side or edge portions of the stock become folded outwardly upon themselves by their passage through the spaces 125 between the bar portions 111 and the plates 113, as indicated at 123c in FIG. 44. The stock then continues on to the heat sealing means 25, 26 where the folded portions 123c of the stock are bonded as at 27 to provide the hems 128, it being noted that in this arrangement the hems are disposed outwardly of the bag walls rather than inwardly as in the previously described embodiments. The open side edge 123' of the stock, of course, provides the bag mouth, without any severing being necessary.

After formation of the hems 128 the sock advances to the drawstring inserting means which may be either of the type shown in FIGS. 1–27 or in FIGS. 29–39 and which therefore does not require further illustration or description in FIGS. 41–44. However, it may be noted that in the hem forming embodiment of FIGS. 41–44 the frame member 13 and plate elements 11a are not necessary.

It is also significant to note that the various embodiments of the machine as shown and described are primarily intended for the manufacture of drawstring-equipped bags made of thin plastic material which is capable of being heat sealed, and for this reason the machine embodies the hem forming means along with the drawstring inserting means. However, as will be apparent, the hem forming operation may be performed in a variety of different ways by a variety of different means, all quite independently and separately from the drawstring inserting operation. Indeed, the material stock may be fed to the drawstring inserting machine with hems already preformed in any suitable manner and, for that matter, the drawstring inserting machine is fully capable of performing its intended function on hem-equipped stock of material other than plastic, as for example, cloth.

It will be also apparent that in keeping with the drawing disclosure the description has been oriented in terms of up and down and side directions, the machine is equally capable of operation in vertical as well as horizontal or inclined planes.

Thus, while in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to within the spirit and scope of the invention as claimed.

What is claimed as new is:

1. In a machine for making drawstring-equipped bags from a flat running length of tubular plastic stock; the combination of a pair of horizontally elongated stock guiding bars disposed in mutually spaced superposed relation and adapted to have one longitudinal edge portion of the stock travel longitudinally over and under the same, means for moving the stock longitudinally along said guiding bars, a creasing plate projecting into the space between said guiding bars for reentrant doubling of said longitudinal edge portion of the stock within itself, means for heat sealing the doubled longitudinal edge portion of the stock to provide a pair of superposed hems each having one of said guiding bars disposed therein, means on said creasing plate for severing the doubled longitudinal edge portion of the stock to separate said hems from each other and form a bag mouth, said guiding bars being provided with opening means at a point longitudinally beyond said severing means, means for passing a drawstring substantially perpendicularly through said hems and through said opening means in said bars, means for cutting the drawstring at a predetermined length with portions of the drawstring projecting above and below the hems, movement of the stock along said guiding bars causing said projecting drawstring portions to be drawn into the hems and eventually withdrawn from said opening means in said bars, and second heat sealing means disposed transversely beyond said bars for separating the stock into individual bags each having a drawstring in the hems thereof and simultaneously joining together the side edges of the bags.

2. The machine as defined in claim 1 wherein said second heat sealing means are positioned relative to said drawstring passing means and to the cut drawstring length so that the ends of the drawstring project outwardly from one joined side edge of each bag.

3. The machine as defined in claim 1 wherein said stock guiding bars have front and rear ends in relation to movement of stock from the front to the rear ends thereof, said machine including frame means for supporting said bars at the front ends thereof only.

4. The machine as defined in claim 1 wherein said stock guiding bars have front and rear ends in relation to movement of stock from the front to the rear ends thereof, said machine having frame means including a horizontal bar supporting frame member disposed in a plane between said bars, said frame member being horizontally offset to one side of said bars and supporting the bars at the front ends thereof only.

5. The machine as defined in claim 4 wherein said frame member also projects horizontally to the relatively opposite side of said stock guiding bars and has said creasing plate secured thereto.

6. The machine as defined in claim 1 wherein said drawstring passing means include a movable arm having a drawstring gripping portion passing through said opening means in said guiding bars.

7. The machine as defined in claim 1 wherein said drawstring passing means include a first oscillatory arm having a drawstring gripping portion for passing the end of a drawstring through said opening means in said guiding bars, and a second oscillatory arm coacting with said first arm and also having a gripping portion for engaging the end of a drawstring passed through said opening means by the gripping portion of the first arm.

8. The machine as defined in claim 7 wherein said first and second arms have oscillatory paths respectively above and below said bars, said gripping portion of the first arm including a needle projectable downwardly through said opening means to bring a drawstring end into engagement with the gripping portion of the second arm below said bars.

9. The machine as defined in claim 1 wherein said opening means in said guiding bars are open at one side of the bars, said drawstring passing means including a rotary arm having a drawstring gripping portion passing downwardly through the open side of said opening means.

10. In a machine for making drawstring-equipped bags from a flat running length of tubular stock; the combination of a pair of horizontally elongated stock guiding bars disposed in mutually spaced superposed relation and adapted to have one longitudinal edge portion of the stock travel longitudinally over and under the same, means for forming a bag mouth and a pair of superposed hems at said longitudinal edge portion of the stock with each of said hems having one of said guiding bars disposed therein, means for moving the stock longitudinally along said bars toward vertically aligned opening means provided in said bars, and means for inserting a drawstring into said hems, said drawstring inserting means comprising an arm movable in a vertical plane, means on said arm for gripping the end of a drawstring and passing the same downwardly through said hems and through said opening means in said bars, and means for cutting the drawstring at a predetermined length with portions of the drawstring projecting above and below the hems, movement of the stock along said bars causing said projecting drawstring portions to be drawn into the hems and eventually withdrawn from said opening means in said bars.

11. The machine as defined in claim 10 wherein the stock is plastic, together with heat sealing means disposed transversely beyond said bars for separating the stock into individual bags each having a drawstring in the hems thereof and simultaneously joining together the side edges of the bags.

12. The machine as defined in claim 11 wherein said heat sealing means are positioned relative to said drawstring inserting means and to the cut drawstring length so that the ends of a drawstring in each bag overlap the drawstring of the next following bag and project outwardly from one joined side edge of the bag when the bags are separated.

13. In a machine for making drawstring-equipped bags from a flat running length of tubular stock; the combination of a pair of horizontally elongated stock guiding bars disposed in mutually spaced superposed relation and adapted to have one longitudinal edge portion of the stock travel longitudinally over and under the same, means for forming a bag mouth and a pair of superposed hems at said longitudinal edge portion of the stock with each of said hems having one of said guiding bars disposed therein, means for moving the stock longitudinally along said bars toward a pair of vertically aligned apertures provided in the bars, and means for inserting a drawstring into said hems, said drawstring inserting means comprising upper and lower arms oscillatory about a common horizontal axis, a drawstring needle carried by the upper arm, means for frictionally gripping the end portion of a drawstring in said needle, said upper arm being movable between a raised position wherein said needle is elevated above said bars to a lowered position wherein the needle is passed downwardly through said hems and through said apertures in said bars, releasable drawstring gripping means carried by the lower arm, said lower arm being movable between a lowered position wherein said gripping means thereof is spaced downwardly from said bars to a raised position wherein said gripping means may engage the end of a drawstring passed downwardly through said apertures by said needle of the upper arm, means for coordinating the oscillatory movement of said arms so that the lower arm is raised while the upper arm is lowered and vice versa, means for cutting the drawstring at the raised position of the upper arm, and means for releasing said gripping means on the lower arm at the lowered positon of the latter whereby to leave free drawstring portions projecting upwardly and downwardly from said hems, movement of the stock along said bars causing said projecting drawstring portions to be drawn into the hems and eventually withdrawn from said apertures in said bars.

14. In a machine for making drawstring-equipped bags from a flat running length of tubular stock; the combination of a pair of horizontally elongated stock guiding bars disposed in mutually spaced superposed relation and adapted to have one longitudinal edge portion of the stock travel longitudinally over and under the same, means for forming a bag mouth and a pair of superposed hems at said longitudinal edge portion of the stock with each of said hems having one of said guiding bars disposed therein, means for moving the stock longitudinally along said bars toward a pair of vertically aligned open sided recesses provided in the bars, and means for inserting a drawstring into said hems, said drawstring inserting means comprising an arm rotatable about a horizontal axis, releasable means carried by said arm for gripping the end of a drawstring, said arm during its rotating movement passing from a position above said bars to a position below the bars with said gripping means moving through said open sided recesses to cut said hems and place the drawstring substantially vertically therethrough, means for cutting the drawstring at a point spaced above said bars, and means for releasing said drawstring gripping means at a point spaced below said bars whereby to leave free drawstring portions projecting upwardly and downwardly from said hems, movement of the stock along said bars causing said projecting drawstring portions to be drawn into the hems and eventually withdrawn from said recesses in said bars.

15. The machine as defined in claim 14 together with a stationary drawstring guide mounted above said bars and having the drawstring passing therethrough, said gripping means being operative to grip the drawstring at said guide during movement of said arm therepast.

16. In a machine for making drawstring-equipped bags from a flat running length of tubular plastic stock; the combination of a pair of horizontally elongated stock guiding means comprising bars disposed in mutually spaced superposed relation and having front and rear ends, said bars being adapted to have one longitudinal edge portion of the stock travel longitudinally over and under the same from the front to the rear ends thereof, a horizontal frame member disposed in a plane between said bars, said frame member being horizontally offset to one side of the bars and supporting said bars at the front ends thereof only, a portion of the frame member also projecting to the relatively opposite side of the bars, hem forming means including a longitudinally extending creasing plate supported by said frame member portion having inclined cam means at its forward end to engage the edge of the advancing stock; said creasing plate projecting into the space between the bars throughout most of its length, means for moving the stock longitudinally along said bars whereby said longitudinal edge portion of the stock may be doubled within itself by said creasing plate, and means intermediate the ends of the creasing plate for heat sealing the doubled longitudinal edge portion of the stock to provide a pair of superposed hems each having one of said bars disposed therein, means on said creasing plate to the rear of said heat sealing means for severing the doubled longitudinal edge portion of the stock to separate said hems from each other and form a bag mouth said bars having apertures to the rear of said severing means, and means for inserting a drawstring into said hems through said apertures.

17. A method for making drawstring-equipped bags from a flat running length of tubular plastic stock; said method comprising the steps of moving the stock longitudinally of its length, creasing one longitudinal edge portion of the moving stock so that it is doubled within itself, heat sealing the doubled longitudinal edge portion of the stock to provide a pair of superposed hems, severing the doubled longitudinal edge portion of the stock to separate said hems from each other and form a bag mouth, and inserting a drawstring into said hems, said step of inserting a drawstring into said hems comprising the steps of placing the hems on a pair of vertically spaced bars provided with vertically aligned opening means, passing a drawstring vertically through the hems and through the opening means in the bars, and moving the hems along said bars so that the drawstring is drawn into the hems and withdrawn from the opening means by movement of the hems relative to the bars.

18. In a machine for inserting a drawstring into a pair of hems on a running length of bag making stock, the combination of a pair of spaced parallel stock guiding bars adapted for passage of the respective hems longitudinally thereover, said guiding bars being provided with aligned opening means, means for passing a drawstring substantially perpendicularly through the hems and through said opening means in said bars, means for cutting the drawstring at a predetermined length with portions of the drawstring projecting outwardly from the hems, and means for advancing said hems along said guiding bars and for causing said projecting drawstring portions to be drawn into the hems and eventually withdrawn from said opening means.

19. The device as defined in claim 18 wherein said drawstring passing means include a movable arm having a drawstring gripping portion passing through said opening means in said bars.

20. In a machine for inserting a drawstring into a pair of hems on a running length of bag making stock, the combination of a pair of spaced parallel stock guiding bars adapted for passage of the respective hems longitudinally thereover, said guiding bars being provided with aligned opening means, means for passing a drawstring substantially perpendicularly through the hems and through said opening means in said bars, and means for cutting the drawstring at a predetermined length with portions of the drawstring projecting outwardly from the hems, movement of the hems along said bars causing said projecting drawstring portions to be drawn into the hems and eventually withdrawn from said opening means, said drawstring passing means including a first oscillatory arm having a drawstring gripping portion for passing the end of a drawstring through said opening means in said bars, and a second oscillatory arm coacting with said first arm and also having a gripping portion for engaging the end of a drawstring passed through said opening means by the gripping portion of the first arm.

21. The device as defined in claim 20 wherein said gripping portion of said first arm includes a drawstring carrying needle projectable through said opening means in said bars to bring the drawstring end into engagement with the gripping portion of the second arm.

22. The device as defined in claim 18 wherein said opening means in said guiding bars are open at one side of the bars, said drawstring passing means including a rotary arm having a drawstring gripping portion passing through the open side of said opening means.

23. In a machine for inserting a drawstring into a pair of hems on a running length of bag making stock, the combination of a pair of spaced parallel stock guiding bars adapted for passage of the respective hems longitudinally thereover, said guiding bars being provided with aligned opening means, first and second oscillatory arms, a drawstring carrying needle provided on said first arm, said first arm being movable to pass said needle through said hems and through said opening means in said bars, releasable drawstring gripping means provided on said second arm, said second arm being movable to a position wherein said gripping means may grip the end of a drawstring passed by said needle through said opening means, means for moving said arms away from said bars whereby to extend the drawstring outwardly from the hems, means for cutting the drawstring at a position of said first arm away from said bars, and means for releasing said gripping means at a position of said second arm away from the bars, movement of the hems along said bars causing the outwardly extended drawstring to be drawn into the hems and eventually withdrawn from said opening means.

24. In a machine for inserting a drawstring into a pair of hems on a running length of bag making stock, the combination of a pair of spaced parallel stock guiding bars adapted for passage of the respective hems longitudinally thereover, said guiding bars being provided with aligned and open-sided recesses, a rotatable arm, releasable means carried by said arm for gripping the end of a drawstring, said drawstring gripping means being movable by said arm through said open-sided recesses in said bars whereby to cut said hems and place the drawstring substantially perpendicularly therethrough, means for releasing said drawstring gripping means at a point away from said bars in one direction, and means for cutting the drawstring at a point away from the bars in the opposite direction whereby to leave the drawstring extended outwardly from the hems, movement of the hems along said bars causing the outwardly extended drawstring to be drawn into the hems and eventually withdrawn from said recesses.

25. The device as defined in claim 24 together with a stationary drawstring guide mounted at a point away from said bars and having the drawstring passing therethrough, said gripping means being operative to grip the drawstring at said guide during movement of said arm therepast.

26. A method of inserting a drawstring into a pair of hems on a running length of bag making stock; said method comprising the steps of placing the hems on a pair of spaced parallel bars having aligned opening means therein, passing a drawstring substantially perpendicularly through the hems and through said opening means, and moving the hems along said bars so that the drawstring is drawn into the hems and withdrawn from said opening means by movement of the hems relative to the bars.

27. A method of inserting a drawstring into a pair of hems on a running length of bag making stock; said method comprising the steps of placing the hems on a pair of spaced parallel bars having aligned opening means therein, passing a drawstring substantially perpendicularly through the hems and through said opening means, cutting the drawstring at a point away from the bars whereby to leave the drawstring extended outwardly in opposite directions from the hems with the mid-portion of the drawstring caught in said opening means, and moving the hems along said bars so that the outwardly extended drawstring is drawn into the hems and eventually withdrawn from said opening means.

28. In a machine for making drawstring-eqipped bags from a longitudinally folded runnnig length of plastic stock having an open longitudinal side edge, the combination of a pair of spaced parallel stock guiding bars adapted to have the open side edge portions of the folded stock travel along the same, a separator plate between said bars, a pair of support plates spaced outwardly from said bars, the open side edge portions of the folded stock being folded upon themselves by passing between the bars and said support plates, means for heat sealing the folded side edge portions of the stock to provide a pair of hems each having one of said guiding bars disposed therein, said guiding bars being provided with aligned opening means at a point longitudinally beyond said heat sealing means, means for passing a drawstring substantially perpendicularly through the hems and through said opening means in said bars, means for cutting the drawstring at a predetermined length with portions of the drawstring projecting outwardly from the hems, movement of the stock along said bars causing the projecting drawstring portions to be drawn into the hems and eventually withdrawn from said opening means.

29. A method for stringing a flattened open-mouth bag having a pair of adjacent front and back walls joined by opposite side edges and a bottom portion, said bag having individual tubular hems at the mouth of the bag which hems have adjacent open ends opposite at least one side edge of said bag, comprising:
  (a) transversely penetrating the hem portions of said bag adjacent one side thereof, drawing a single length of cord through transversely aligned openings in the hem portions of the bag formed during the penetrating step until the approximate mid point of said cord is between the inner plies of the hems of the adjacent walls and opposite end portions of said cord extend from the front and back walls respectively of said bag, the length of said cord being at least greater than twice the width of said bag,
  (b) releasing the opposite end portions of said cord,
  (c) slidably engaging the portions of said cord opposite said mid point which lie within each of said tubular hems with slidable engaging means extending into said hems through said adjacent open ends,
  (d) pulling said bag away from said engaging means whereby the mid portion of said cord is pulled by the inner walls of said individual hems away from said engaging means and the opposite end portions of said cord are drawn within said hems by said engaging means until said end portions lie within respective hems and their terminal ends project beyond the open ends of said hems outside of said bag.

30. Apparatus for stringing a flattened open-mouth bag of a type having a pair of adjacent front and back walls joined by opposite side edges and a bottom portion, and individual open ended tubular hems at the mouth of the bag bordering said mouth, comprising means for transversely penetrating the hem portions of said bag through front and back walls adjacent one side edge thereof, means for drawing a single length of cord through transversely aligned openings in the hem portions of the bag formed by said penetrating means until the approximate mid point of said cord lies between the hems of the adjacent walls and opposite end portions of said cord extend from opposite sides of said bag, means for slidably engaging the portions of said cord opposite said mid point which lie within each of said tubular hems, said slidable engaging means extending into said tubular hems through adjacent open ends, and means for pulling said bag away from said engaging means whereby the mid portion of said cord is pulled by the forward motion of said hems away from said engaging means and the opposite end portions of said cord are drawn within said hems by said engaging means until said end portions lie within respective hems and their terminal ends project beyond the open ends of said hems outside of said bag.

31. A method of making drawstring equipped bags from a running length supply of thin flexible web material which is folded along a median longitudinal fold line into double thickness and is provided with tubular hems along the adjacent side edges of said folded web, comprising the steps of placing the hems along a pair of spaced bars provided with aligned opening means, passing a drawstring through the hems and through the opening means in the bars, moving the hems along said bars so that the drawstring is drawn into the hems and withdrawn from the opening means by movement of the hems relative to the bars, and successively joining the opposite thicknesses of said folded web material at spaced intervals equal to the width of said bags along transverse bands and severing said thicknesses along a median line through said band to form individual bags.

32. A method for continuously making and stringing bags comprising:
  (a) feeding from a running length supply of tube of thin, flexible material which is flattened to provide a pair of opposite side walls which are joined along a pair of parallel longitudinal fold lines,
  (b) progressively engaging one longitudinal fold line and pressing it inwardly between the opposite side walls thereby forming a pair of inturned wall portions, the inturned wall portions being joined to each other along said one longitudinal fold line, and to respective side walls along parallel outer fold lines,
  (c) joining each of said inturned wall portions to its associated side wall along an inner seam which is adjacent to said one inturned longitudinal fold line and parallel to and spaced from said outer fold line thereby forming a pair of inturned tubular hems on said opposite side walls,
  (d) slitting said tube along said inturned longitudinal fold line,
  (e) successively passing strings of predetermined length transversely through the opposite side walls of said slitted tube at aligned points located in the hems near the leading edge of successive lengths of said slitted tube until the approximate mid point of each string is intermediate the hems of opposite side walls, and opposite end portions of each string extend outwardly from said side walls, said lengths being equal to the widths of successive bags being formed, and each string being of a length greater than twice the width of said bag,
  (f) releasing the opposite ends of the string,
  (g) slidably engaging the portions of said string within said hems by fixed engaging means as the slitted tube is fed forward so that the lengths of the string opposite its mid point are pulled within the respective hems by the forward motion of the slitted tube relative to said fixed engaging means,
  (h) and successively joining the opposite side walls of said slitted tube at spaced intervals equal to the width of said bags along transverse bands and severing said walls along a median line through said band, said band being transverse to the longitudinal axis of said slitted tube.

33. The method set forth in claim 32 wherein said tube is pulled intermittently from said supply.

34. The method set forth in claim 32 wherein each transverse band is positioned to extend across the trailing end portions of the string within the hem portions of one bag with the terminal ends of said string extending rearwardly beyond said band, and the mid portion of the string of the next succeeding bag lying outside of but adjacent to the trailing edge of said band, the mid portion of the string within said next succeeding bag being located forward of the terminal ends of the trailing string portions within the adjacent bag forward thereof in the direction of bag motion.

35. The method set forth in claim 32, wherein the tube is made of thermoplastic material and the joining of the opposite side walls of said slitted tube along transverse bands is performed by heat sealing and said severing is performed simultaneously.

36. Apparatus for continuously making and stringing bags comprising:
  (a) means feeding from a running length supply a tube of thin, flexible material which is flattened to provide a pair of opposite side walls which are joined along a pair of parallel longitudinal fold lines,
  (b) means progressively engaging one longitudinal fold line and pressing it inwardly between the opposite side walls thereby forming a pair of inturned wall portions, the inturned wall portions being joined to each other along said one longitudinal fold line, and to respective side walls along parallel outer fold lines, (c) means for joining each of said inturned wall portions to its associated side wall along an inner seam which is adjacent to said one inturned longitudinal fold line and parallel to and spaced from said outer fold line thereby forming a pair of inturned tubular hems on said opposite side walls, (d) means for slitting said tube along said inturned longitudinal fold line, (e) means for successively passing strings of predetermined length transversely through the opposite side walls of said slitted tube at aligned points located in the hems near the leading edge of successive lengths of said slitted tube until the approximate mid point of each string is intermediate the hems of opposite side walls and opposite end portions of each string extend outwardly from said opposite side walls, said lengths being equal to the widths of successive bags being formed, and each string being of a length greater than twice the width of said bag, (f) means for releasing the opposite ends of the string, (g) means extending within the hem portions of the slitted tube for slidably engaging portions of said string within said hems as said slitted tube is fed forward and pulling the end portions of said string within the respective hems, (h) and means for successively joining the opposite side walls of said slitted tube at spaced intervals equal to the width of said bags along transverse bands and severing said walls along a median line through said band, said band being transverse to the longitudinal axis of said slitted tube.

References Cited

UNITED STATES PATENTS

| | | | |
|---|---|---|---|
| 1,018,133 | 2/1912 | Scott | 53—139 X |
| 2,994,128 | 8/1961 | Penney | 29—433 X |
| 3,058,403 | 10/1962 | Kugler | 93—8 |
| 3,166,035 | 1/1965 | Wiegand | 112—2 |
| 3,196,757 | 7/1965 | Samways | 93—35 |

WAYNE A. MORSE, JR., *Primary Examiner.*